United States Patent
Schmidt et al.

(10) Patent No.: US 10,782,172 B2
(45) Date of Patent: Sep. 22, 2020

(54) DOSING DEVICE

(71) Applicant: Obrist Closures Switzerland GMBH, Reinach (CH)

(72) Inventors: Patrick Schmidt, Zell-Kaimt (DE); Peter Stoelben, Briedel Mosel (DE)

(73) Assignee: OBRIST CLOSURES SWITZERLAND GMBH, Reinach (CH)

( * ) Notice: Subject to any disclaimer, the term of this patent is extended or adjusted under 35 U.S.C. 154(b) by 0 days.

(21) Appl. No.: 16/070,654

(22) PCT Filed: Jan. 19, 2017

(86) PCT No.: PCT/EP2017/051125
§ 371 (c)(1),
(2) Date: Jul. 17, 2018

(87) PCT Pub. No.: WO2017/125519
PCT Pub. Date: Jul. 27, 2017

(65) Prior Publication Data
US 2019/0265090 A1    Aug. 29, 2019

(30) Foreign Application Priority Data

Jan. 19, 2016  (GB) .................................. 1600935.9
Nov. 25, 2016  (GB) .................................. 1619979.6

(51) Int. Cl.
*G01F 11/10*    (2006.01)
*G01F 11/28*    (2006.01)

(52) U.S. Cl.
CPC .................................... *G01F 11/28* (2013.01)

(58) Field of Classification Search
CPC ...... G01F 11/28; G01F 11/266; G01F 11/262; B67D 3/0006; B67D 3/0051; B67D 3/0003
(Continued)

(56) References Cited

U.S. PATENT DOCUMENTS

| 1,752,620 A | 4/1930 | Swindin |
| 2,208,862 A * | 7/1940 | Stringfellow ......... G01F 11/262 222/188 |

(Continued)

FOREIGN PATENT DOCUMENTS

| AU | 2011100683 A4 | 7/2011 |
| DE | 2318120 | 10/1974 |

(Continued)

OTHER PUBLICATIONS

Hydramotion Ltd., 2016, 1 York Road Park, Malton, York YO17 6YA, England • Tel: +44 (0)1653 600294 • www.hydramotion.com.*

(Continued)

*Primary Examiner* — Charles Cheyney
(74) *Attorney, Agent, or Firm* — James F. Lea, III; Gable Gotwals

(57) ABSTRACT

A dosing device is provided and comprises: a dosing chamber having an inlet through which product can enter from a container; an outlet into which product flows from the chamber and through which product flows out of the device; a siphon member located around the outlet; a vent opening in the chamber; a container-side vent which opens into the container, in which: the siphon member terminates at a level L1 with respect to the outlet; the outlet opens into the chamber at a level L2; such that in use product flows into the chamber through the inlet/s and fills the chamber until L2 is reached and then product is siphoned from the chamber into the outlet by the siphon member, the siphoning continuing until product in the chamber reaches L1, whereupon: air entering the vent opening interrupts the siphoning; and air vents into the container through the container-side vent such that thereafter recharging of the chamber repeats, in which (Continued)

a chicane is provided for preventing leakage of product through the vent opening.

23 Claims, 18 Drawing Sheets

(58) Field of Classification Search
USPC .................................. 222/416, 454, 71, 424
See application file for complete search history.

(56) References Cited

U.S. PATENT DOCUMENTS

| | | | | | |
|---|---|---|---|---|---|
| 2,442,133 | A | * | 5/1948 | Philip | G01F 11/266 222/71 |
| 2,584,130 | A | * | 2/1952 | Huebl | G01F 11/262 222/455 |
| 2,678,757 | A | * | 5/1954 | Ernest | G01F 11/266 222/416 |
| 2,689,671 | A | * | 9/1954 | George | G01F 11/266 222/416 |
| 2,714,977 | A | * | 8/1955 | Davis | B65D 47/06 222/424.5 |
| 3,081,008 | A | * | 3/1963 | Hester | G01F 11/266 222/416 |
| 3,193,160 | A | * | 7/1965 | Veit | G01F 11/266 222/440 |
| 3,220,619 | A | * | 11/1965 | Lodding | G01F 11/262 222/416 |
| 3,254,808 | A | * | 6/1966 | Seymour | G01F 11/266 222/416 |
| 3,707,247 | A | * | 12/1972 | Guala | G01F 11/262 222/188 |
| 3,920,149 | A | * | 11/1975 | Fortino | B67D 3/0006 222/1 |
| 3,968,907 | A | | 7/1976 | Nix | |
| 5,427,279 | A | * | 6/1995 | Kaufman | A47K 5/1211 222/207 |

FOREIGN PATENT DOCUMENTS

| | | |
|---|---|---|
| DE | 3308012 A1 | 9/1984 |
| EP | 0176461 A1 | 4/1986 |
| EP | 0207715 A1 | 1/1987 |
| FR | 2329981 A1 | 1/1977 |
| GB | 253675 | 6/1926 |
| GB | 507771 | 6/1939 |
| GB | 685470 | 1/1953 |
| GB | 1153992 | 6/1969 |
| GB | 1300058 | 12/1972 |

OTHER PUBLICATIONS

Intellectual Property Office of Great Britain, Search Report for GB 1619979.6, dated Feb. 7, 2017.
Intellectual Property Office of Great Britain, Search Report for GB 1600935.9, dated Apr. 22, 2016.
European Patent Office, International Search Report for PCT/EP2017/051125, dated Apr. 7, 2017.

* cited by examiner

Equipment used

Rheometer 301 (Anton Paar)

Cylindrical central tool is used to measure:

→ Viscosity $\eta = f(\dot{\gamma}, \text{shear rate})$

→ Shear stress $\tau = f(\dot{\gamma}, \text{shear rate})$

Results table : viscosity measurements

| Product | Kind / Brand | Viscosity to be used (mPa.s-1) |
|---|---|---|
| Water | Demineralised | 1.1 |
| Wine | Rosé | 1.5 |
| Wine | Red | 1.6 |
| Wine | White | 1.9 |
| Cointreau | 1849 | 5.6 |
| Whisky | Drambuie | 10.1 |
| Baileys | Original | 20.3 (at 100s-1) |
| Olive Oil | Puget | 68.1 |

During a fluid dispensing, the sheer rate $\dot{\gamma}$ range is between 50 and 100 s-1.

Its why the baileys value is given at 100s-1. Nevertheless, the measured baileys viscosity was between (see previous slide) :
20.9 +/- 0.22 @ 50 mPa.s-1
19.42 +/- 0.01 @ 300 mPa.s-1

Figure 19

DOSING DEVICE

The present invention relates to a device for the controlled delivery of a dose of flowable product from a container.

In some aspects and embodiments the present invention relates to an apparatus and means of repeatedly dispensing controlled doses of liquid.

One field of use is that of dosing devices for domestic or household use, containing detergents such as hard surface cleaning compositions or other cleaning preparations, fabric conditioners and the like.

Other fields of use include, for example, dosing devices for manual and automatic dishwashing liquids, hair-care products and oral care applications such as mouth washes.

It may be desirable to deliver repeated doses of liquid without requiring the recurring inversion of the container.

According to an aspect of the present invention there is provided a dosing device comprising.

a dosing chamber having an inlet through which product can enter from a container
an outlet into which product flows from the chamber and through which product flows out of the device;
a siphon member located around the outlet
a vent opening in the chamber
a container-side vent which opens into the container.

in which:
the siphon member terminates at a level L1 with respect to the outlet
the outlet opens into the chamber at a level L2
such that in use product flows into the chamber through the inlet/s and fills the chamber until L2 is reached and then product is siphoned from the chamber into the outlet by the siphon member, the siphoning continuing until product in the chamber reaches L1,
whereupon:
air entering the vent opening interrupts the siphoning and
air vents into the container through the container-side vent such that thereafter recharging of the chamber repeats,
in which
a chicane is provided for preventing leakage of product through the vent opening.

The chicane may include a reservoir for catching product in advance of the vent opening.

The inlet may comprise one or more apertures.

The vent opening may comprise a tube.

The vent opening tube may have one end which opens into the chamber and one end which is exposed to atmospheric pressure.

The vent opening may open into the chamber at a level L3 which is above L2 in use.

The container-side vent may be a tube.

Air may vent into the container from the vent opening and/or from the outlet.

The vent opening may be provided with a one-way valve for allowing air into the chamber but preventing outflow of product therethrough.

The outlet may be a tube.

The siphon member may have a generally ellipsoidal section. In some embodiments the siphon member may have a generally 8-shape section. This can enable the doser to dispense whilst orientated at a variety of angles (in addition to when inverted to 180 degrees).

The outlet may have a generally circular section.

The present invention also provides a dosing device comprising a dispensing chamber having one or more inlet apertures through which product can enter the device from a container.
an outlet tube into which product flows from the chamber and through which product flows out of the device;
a siphon bell located around the outlet tube
an atmosphere vent tube positioned in the chamber and having one end which opens into the chamber and at the other end is exposed to atmosphere.
a container-side vent tube which extends into the container.

in which:
the siphon bell terminates at a height H1 with respect to the outlet tube
the outlet tube opens into the chamber at a height H2
such that in use product flows into the chamber through the inlets and fills the chamber until it reaches H2 and then product is siphoned from the chamber into the outlet tube through a gap between the siphon bell and the outlet tube, the siphoning continuing until product in the chamber reaches height H1, whereupon:
air entering the chamber from the atmosphere vent tube interrupts the siphoning
air vents into the container through the container-side vent tube
and thereafter re-charging of the dosing chamber repeats, in which
a chicane is provided for preventing leakage of product through the vent opening.

In some embodiments the device is configured to work using just gravity and air pressure differences i.e. without requiring any positive pressure to be exerted (for example by squeezing a bottle). In other words the device will work to provide one or more doses simply by upturning the container and without further intervention required by a user; in particular the device is self-dosing and self-recharging so that if the container is left upturned the device will charge and dose, then recharge and dose again.

An advantage of the present invention is that dosage during use (i.e. as the liquid being dispensed is depleted from the container) is achieved whilst providing optimal ergonomics for the end user who can dispense a dose of liquid without experiencing strain during and/or in-between two dosing operations while holding the container with the dosing device at his most comfortable orientation i.e. angle. Indeed in a preferred embodiment, the dosing apparatus of the present invention consists of an ergonomic dosing apparatus.

In some embodiments the device is configured to work at up to around 45° inclination i.e. when the container is tilted as well as when it is upside down.

The present invention also provides a device as described herein in combination with a container.

The container may be filled with flowable product.

The flowable product may have a viscosity in the range 0.001 mPa·s to 10 mPa·s.

The viscosity limit for the flowable product may be approximately 0.1 Pa·s at 100 s−1.

In some embodiments, for example, the pack is tuned to work with products such as water or products having a similar viscosity: water has a viscosity of 1 mPa·s at 20° C. or 0.9321 at 23° C.

In other embodiments, for example, the pack is tuned to work with products having a higher viscosity, such as household and/or industrial cleaning products including detergents, washing up liquid, laundry care, floor cleaner, fabric softener and dishwasher products. In addition, the dosing devices suitable for dosing any type of alcoholic beverages, viscous food products such as ketchup, mustard or honey For example a product having a viscosity in the range 2 to 3 mPa·s at 23° C. or in the range 1 to 2 mPa·s at 23° C.

In some embodiments the viscosity law for the product is approximately $\eta=0.222\cdot\gamma^{-0.4}$.

The capacity of the container may, for example, be in the range 100 ml to 5 litre, such as 250 ml to 1 litre, such as 500 ml, 750 ml or 1 litre.

In some aspect and embodiments the present invention relates to a detergent dosing device, characterised by the specific viscosity of the liquid to be dosed.

The container may, for example, be a plastics container such as a blow moulded bottle.

In a further aspect the present invention relates to an apparatus and means of repeatedly dispensing controlled doses of liquid. In a preferred embodiment the present invention relates to a dosing apparatus for dispensing a dose of liquid comprising: a container, a dosing device operably connected to said container, a liquid contained in said container; characterized in that said liquid is a shear thinning liquid and in that said shear thinning liquid has a viscosity of greater than 1 Pa·s measured at 100 s"$^1$ at 23° C.

In further aspect the present invention relates to the use of the dosing device for dosing viscous products. Preferably, products having a viscosity in the range of 1 Pa·s to 3 Pa·s measured at 100 s"$^1$ at 23° C.

Different aspects and embodiments of the invention may be used separately or together. For example, a device with a crimping flange in the ranges specified in combination with a valve having a peripheral flange in the ranges specified and a weight in the ranges specified.

Further particular and preferred aspects of the present invention are set out in the accompanying independent and dependent claims. Features of the dependent claims may be combined with the features of the independent claims as appropriate, and in combination other than those explicitly set out in the claims.

The present invention will now be more particularly described, with reference to the accompanying drawings.

In the following description, all orientational terms, such as upper, lower, radially and axially, are used in relation to the drawings and should not be interpreted as limiting on the invention or its connection to a closure.

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples.

There is no intent to limit to the particular forms disclosed and as well as individual embodiments the invention is intended to cover combinations of those embodiments as well. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent; however, the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

BRIEF DESCRIPTION OF THE DRAWINGS

FIG. 19 is a results table showing viscosity measurements.

DETAILED DESCRIPTION OF THE PREFERRED EMBODIMENTS

Figure 1:
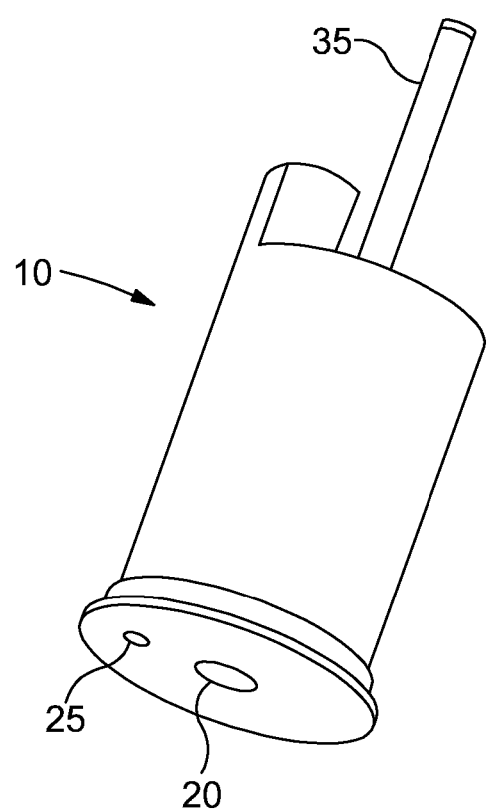
FIG. 1 is a perspective view of an embodiment of a drawing of a dosing device of the invention.
Figure 2:
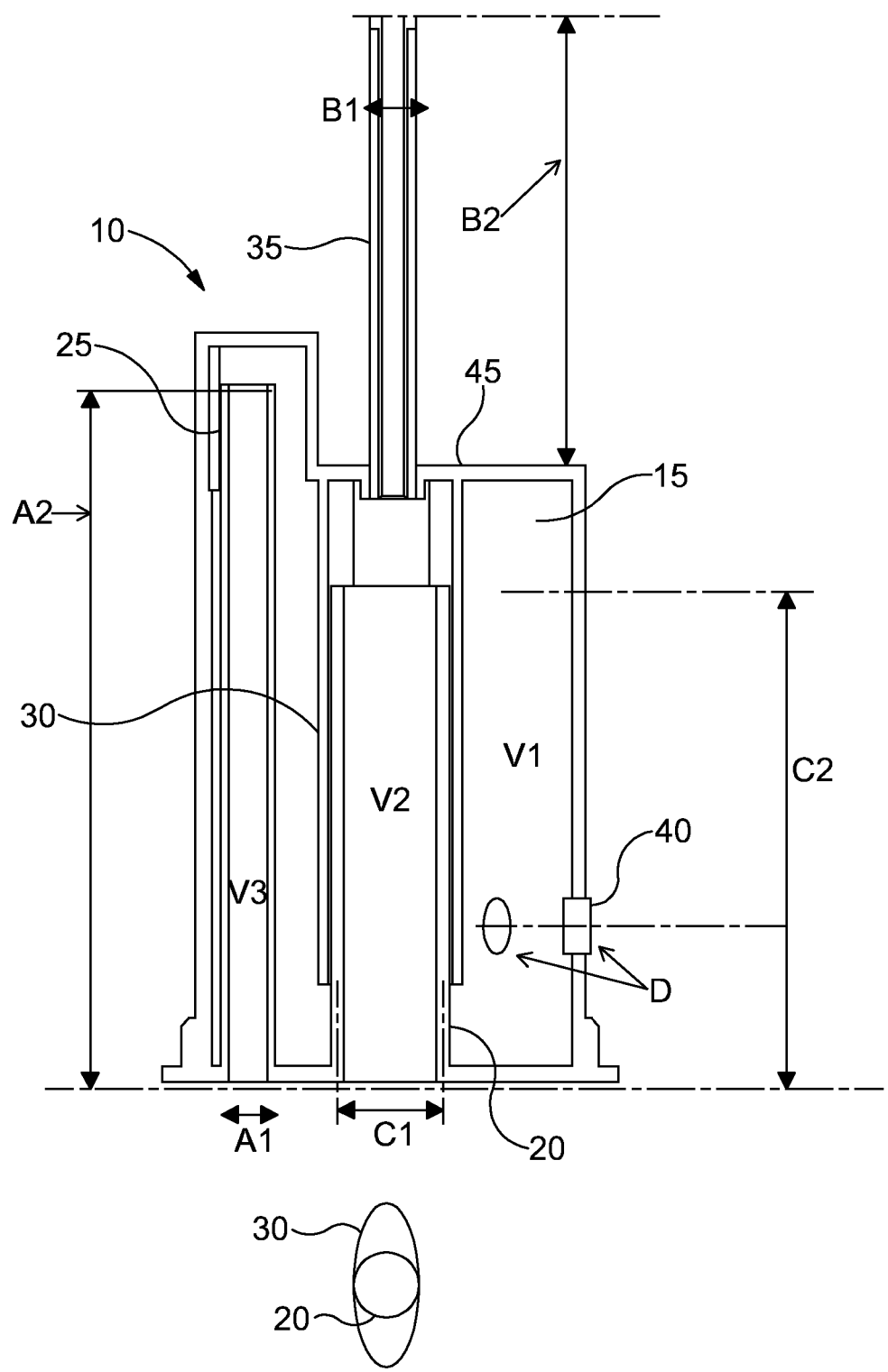
FIG. 2 is a cross-sectional view of the dosing device of FIG. 1.

FIGS. 1 and 2 show a dosing device generally indicated 10.

The device comprises a body with: a main chamber 15: an outlet tube 20; a vent pipe 25; a siphon bell 30 and a container-side vent 35.

The chamber 15 has product inlets 40. In this embodiment four to fourteen inlets are provided.

The body has a top plate 45 from which the vent 35 extends.

The outlet tube 20 is generally cylindrical and generally central (but does not have to be) and is in fluid communication with the vent 35, although the tube itself terminates at a level L2 before the vent 35 i.e. they are not continuous.

The siphon bell 30 has a generally elliptical section and extends from the top plate down and around the tube 20 (which creates a gap around the outlet tube). Note that it does not extend all the way to the bottom of the tube 20 and terminates at a level L1.

The inventors have surprisingly found that due to this elliptical or 8 shaped section it is possible to pour the product at various angles. Hence, it is not necessary to hold the container, i.e. the dosing device at a specific angle. Hence, this 8-shaped section ensures that enough product will flow into the product chamber while maximum speed even at an low angle thus permitting an ergonomic handling for the consumer.

The vent pipe 25 extends from the exterior of the device through the chamber and terminates at a level L3 (which is higher than L2).

Figure 3:
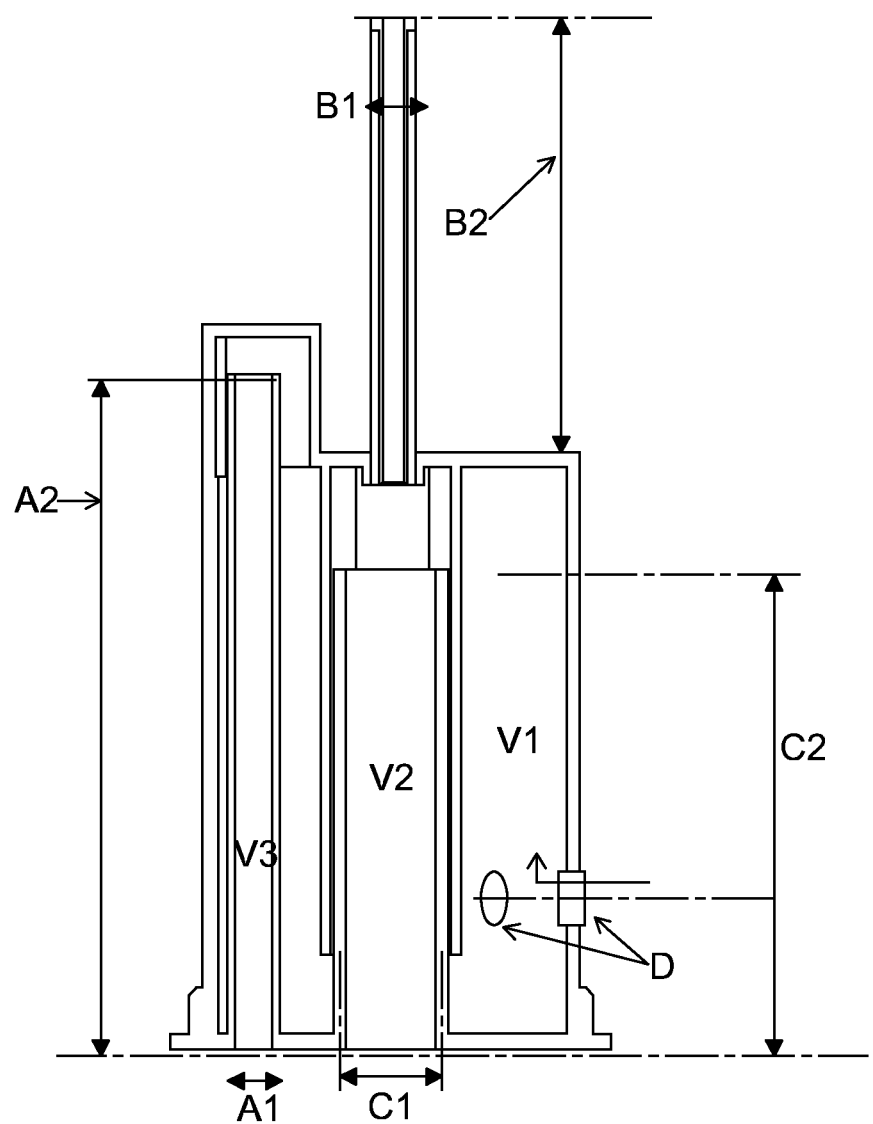
FIG. 3 is a cross-sectional view of the dosing device of FIG. 1.

In use the device is attached to a container (not shown) filled with flowable product. If the container is upturned product starts to fill the chamber 15 through the inlets 40 (FIG. 3).

Figure 4:
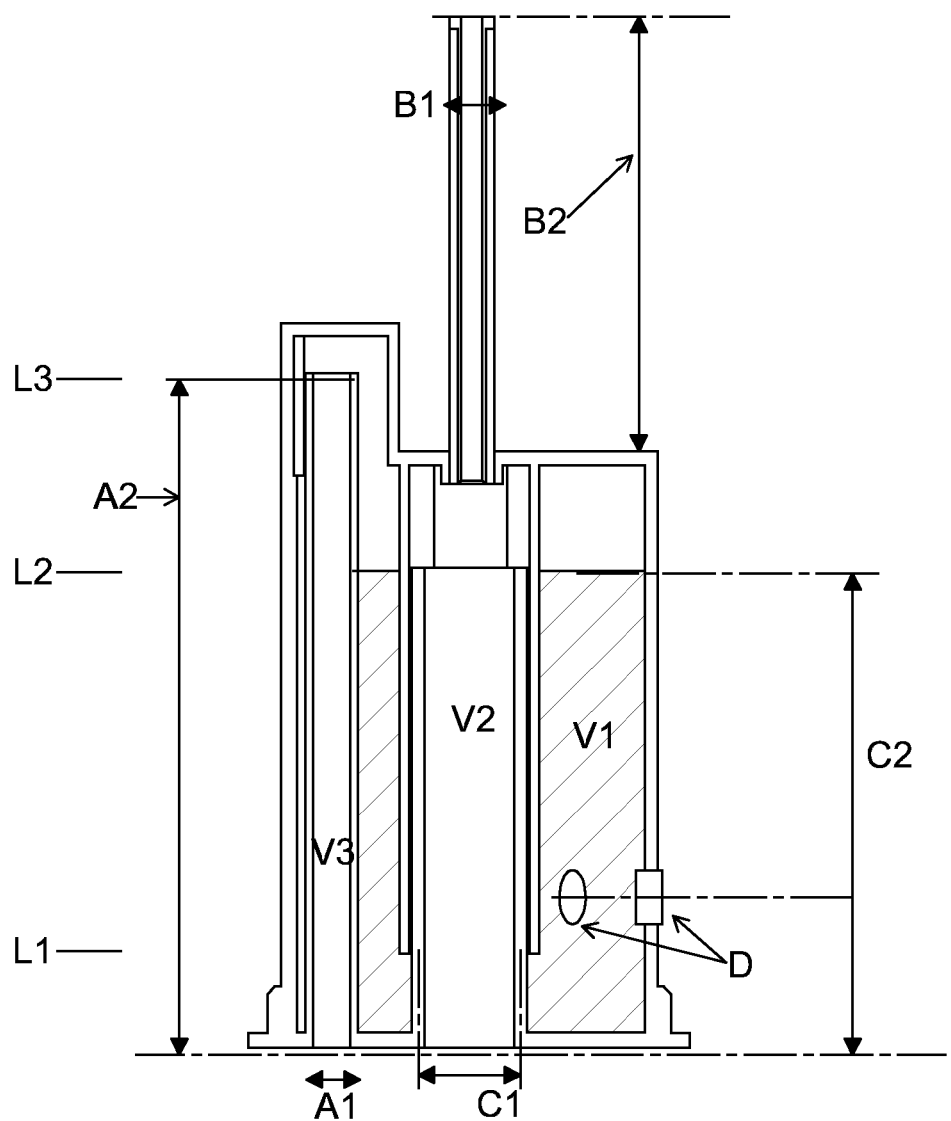
FIG. 4 is a cross-sectional view of the dosing device of FIG. 1 showing product beginning to be siphoned between an interior of a siphon bell and an exterior of an outlet tube.
Figure 5:
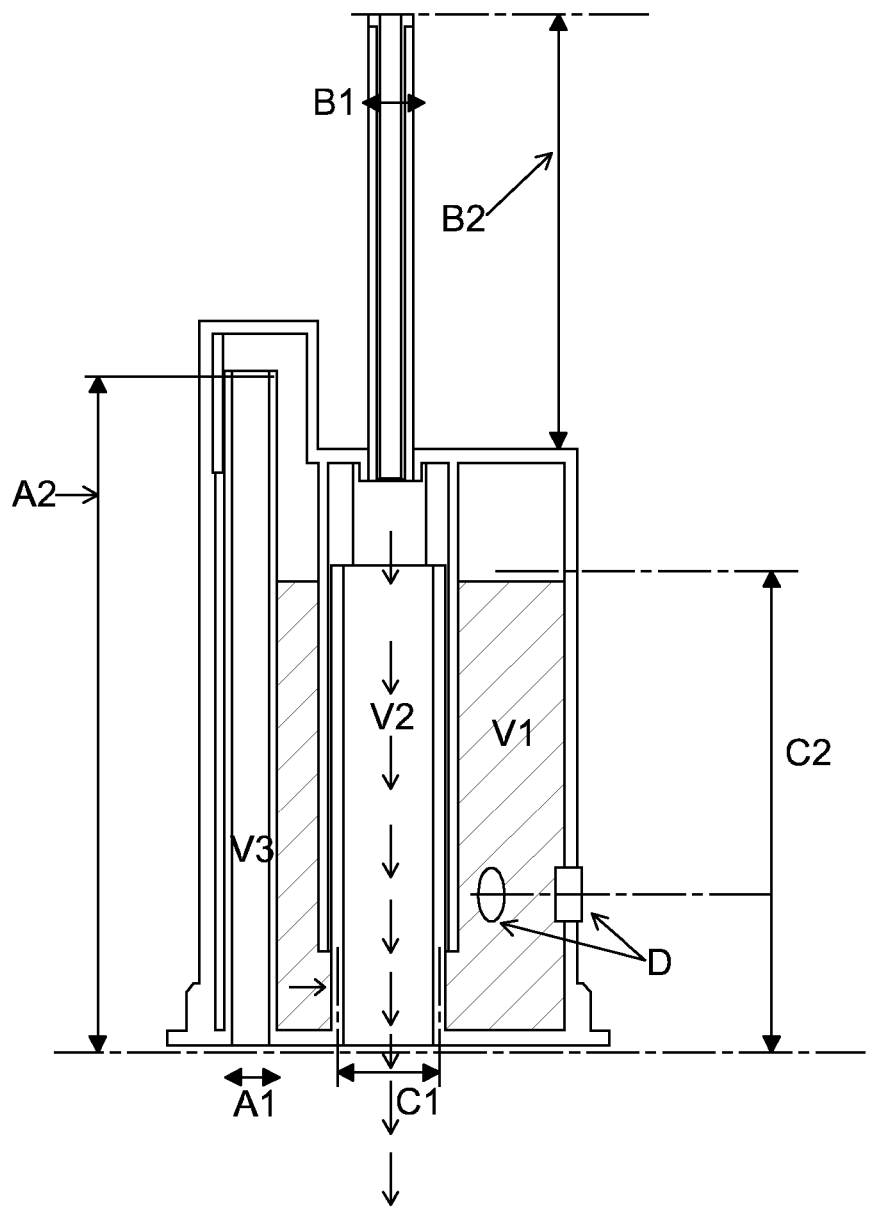
FIG. 5 is a cross-sectional view of the dosing device of FIG. 1 show product flowing down the outlet tube and out of the device.

Product continues to fill the chamber 15 until level L2 is reached (FIG. 4) at which point product begins to be siphoned between the interior of the siphon bell 30 and the exterior of the outlet tube 20, flowing between the top of the tube 20 and the top plate 45 (not out of the vent 35), down the outlet tube 20 and out of the device (FIG. 5).

Figure 6:
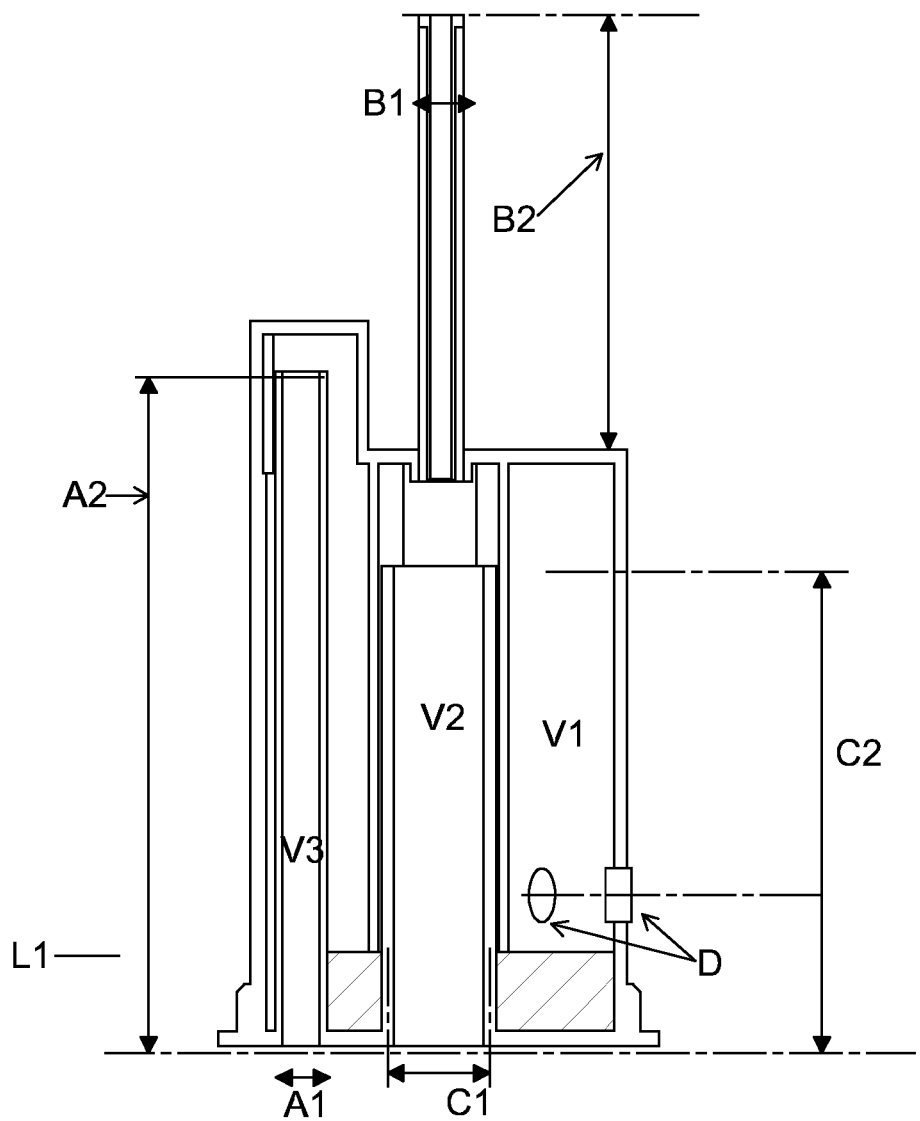
FIG. 6 is a cross-sectional view of the dosing device of FIG. 1 showing product at a level L1 where product flow ceases.
Figure 7:
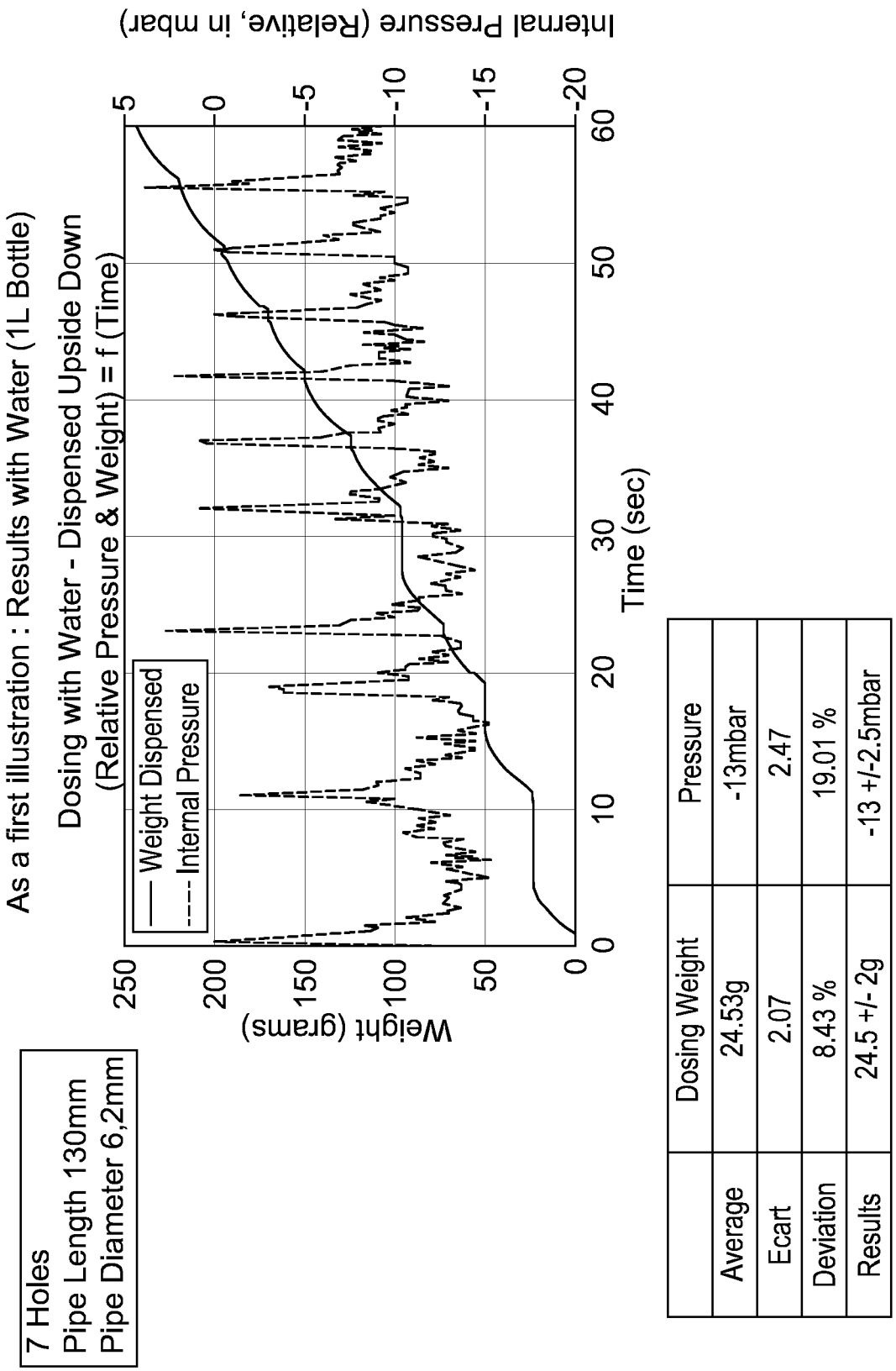
FIG. 7 shows time, pressure and weight data collected from dispensing through dosing devices of the invention.
Figure 8:
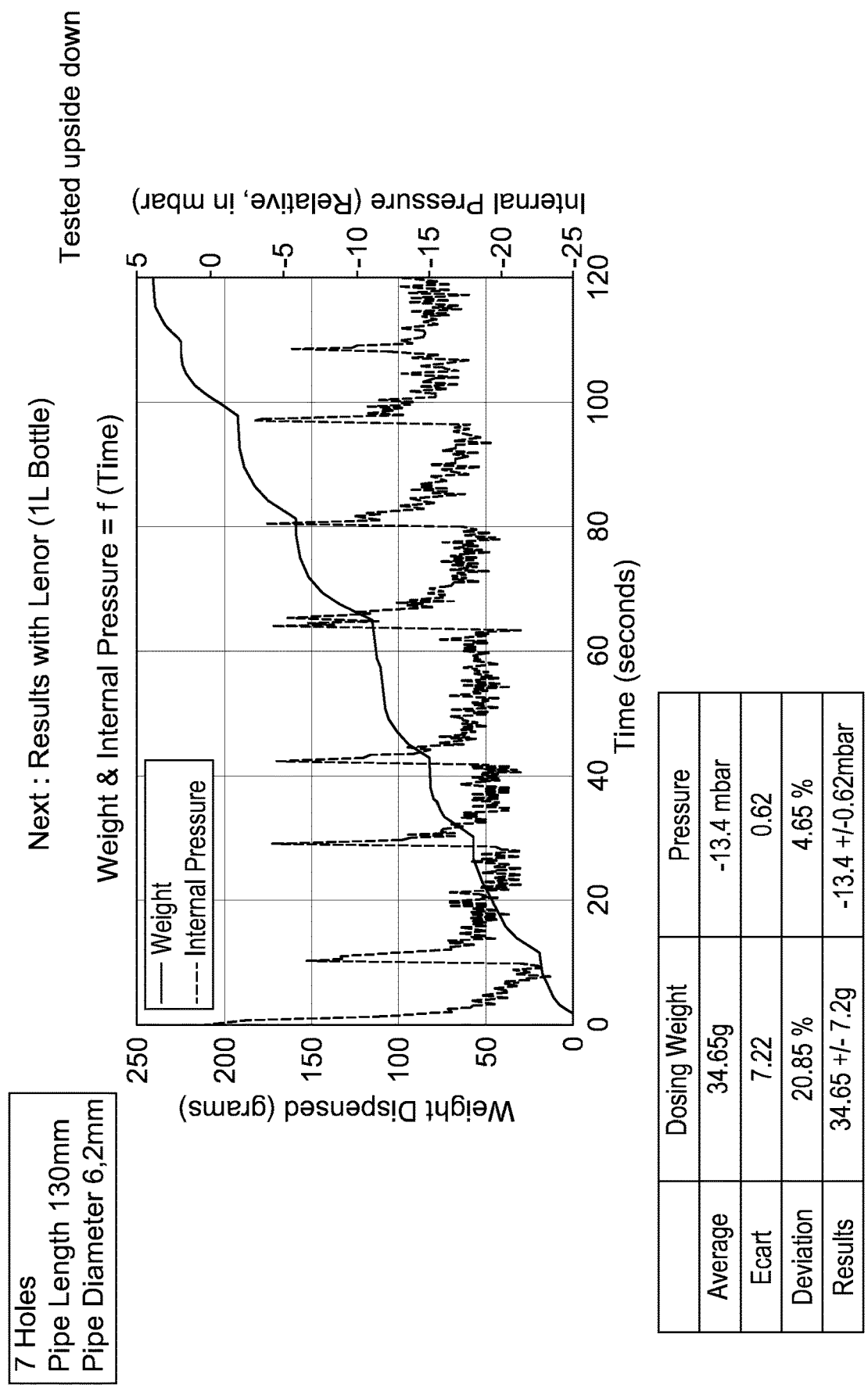
FIG. 8 shows time, pressure and weight data collected from dispensing through dosing devices of the invention.
Figure 9:
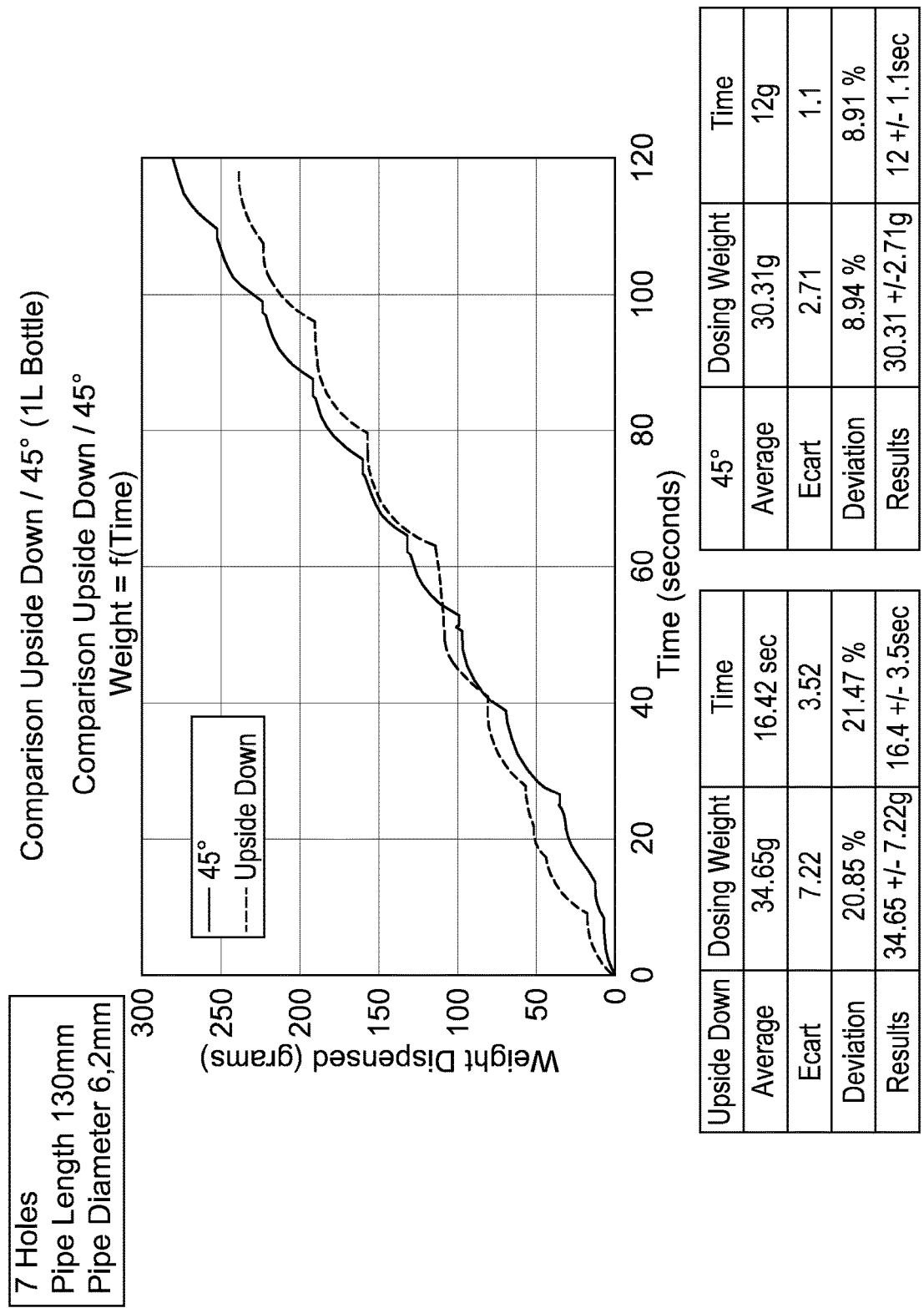
FIG. 9 shows time and weight data collected from dispensing through dosing devices of the invention.
Figure 10:
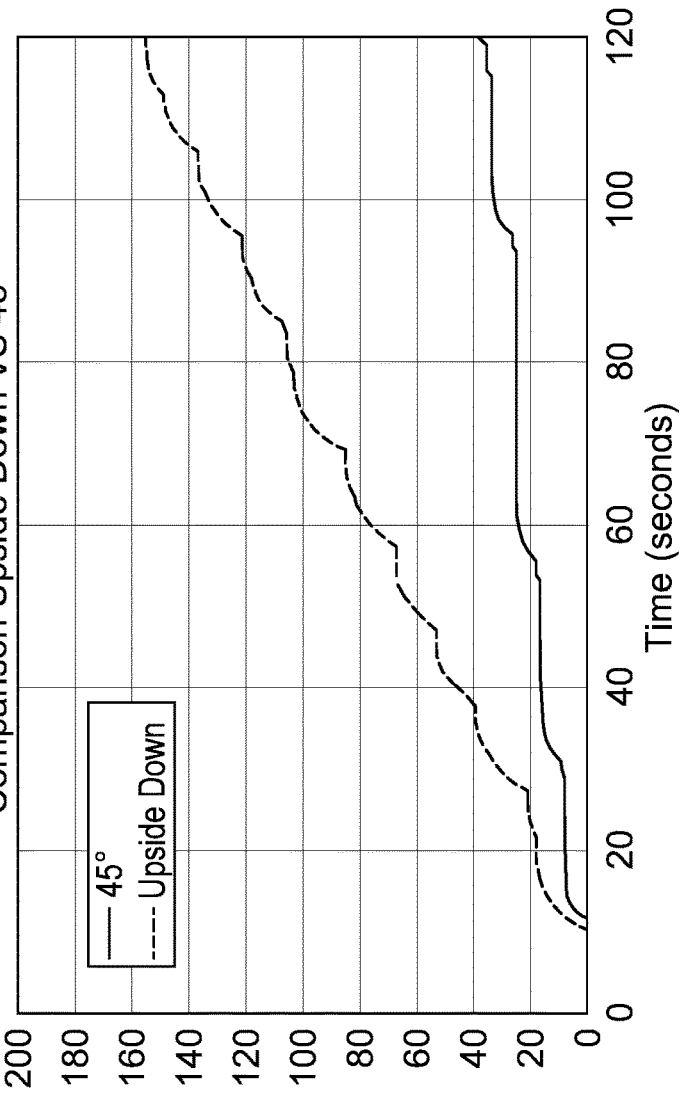
FIG. 10 shows time and weight data collected from dispensing through dosing devices of the invention.

Product flows out of the chamber 15 until level L1 is reached (FIG. 6). At this point the siphoning is interrupted by the air in the vent pipe 25 and the dose from the device is complete. Air can now vent into the container through the outlet tube 20 and then the vent 35. Recharging of the device then begins and the process can repeat.

Below is described a series of experiments conducted with various input parameters for different parts of the device based on the general structure described above.

Value of A=Air chamber
A1 Diameter (doesn't vary, 6.2 mm)
A2 Height=59 mm now (>C2)
Value of B=Central Pipe
B1 Diameters: 4.3 mm or 6.2 mm
B2 Height: between 0 mm and 130 mm
Value of C=Dispensing Chamber
C1 Diameter: 10 mm (doesn't vary)
C2 Height: 42 mm (doesn't vary)
Value of D=Holes
D Number of holes: up to 7 holes
G Tilted performance: upside down (UD) or 45°
Vo 2 bottles (Lenor®): 1 L & 0.75 L

TABLE 1

| Bottle Volume (ml) | B1 pipe diameter (mm) | Upside Down or 45° | D number of holes | B2 length (mm) |
|---|---|---|---|---|
| 750 | 6.2 | UD | 4 | 130 |
| 750 | 6.2 | UD | 7 | 50 |
| 750 | 6.2 | UD | 7 | 130 |
| 750 | 6.2 | 45° | 7 | 50 |
| 750 | 6.2 | 45° | 7 | 130 |
| 1000 | 6.2 | UD | 4 | 50 |
| 1000 | 6.2 | UD | 7 | 50 |
| 1000 | 6.2 | UD | 7 | 130 |
| 1000 | 6.2 | 45° | 4 | 50 |
| 1000 | 6.2 | 45° | 7 | 50 |
| 1000 | 6.2 | 45° | 7 | 130 |

A1, A2, C1, C2 fixed.

Figure 16:
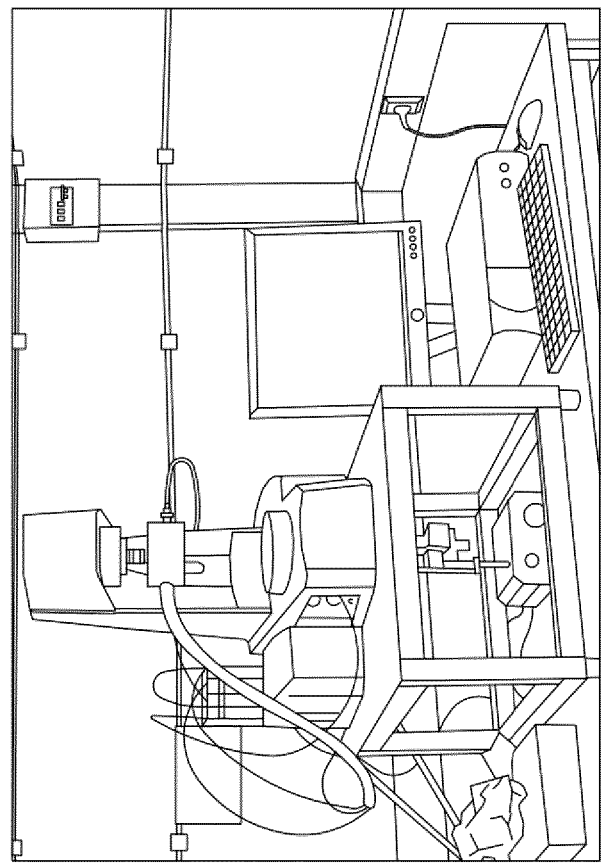
FIG. 16 details equipment used in experiments using devices of the invention.
Figure 16:
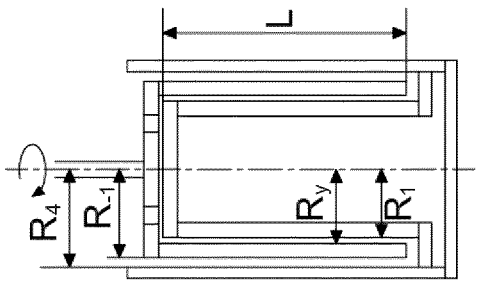
Figure 17:
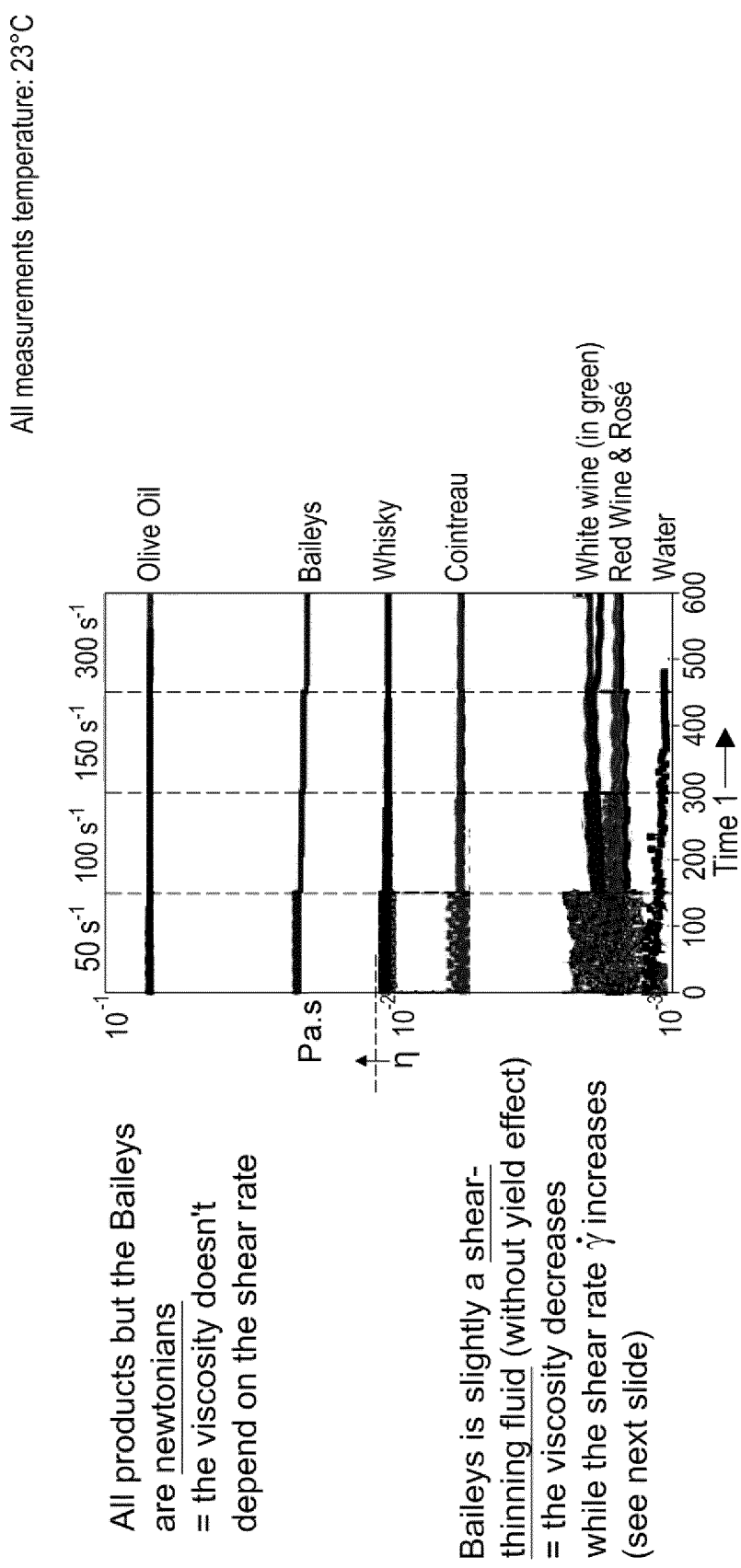
FIG. 17 is a graph showing rheological behavior of products.
Figure 18:
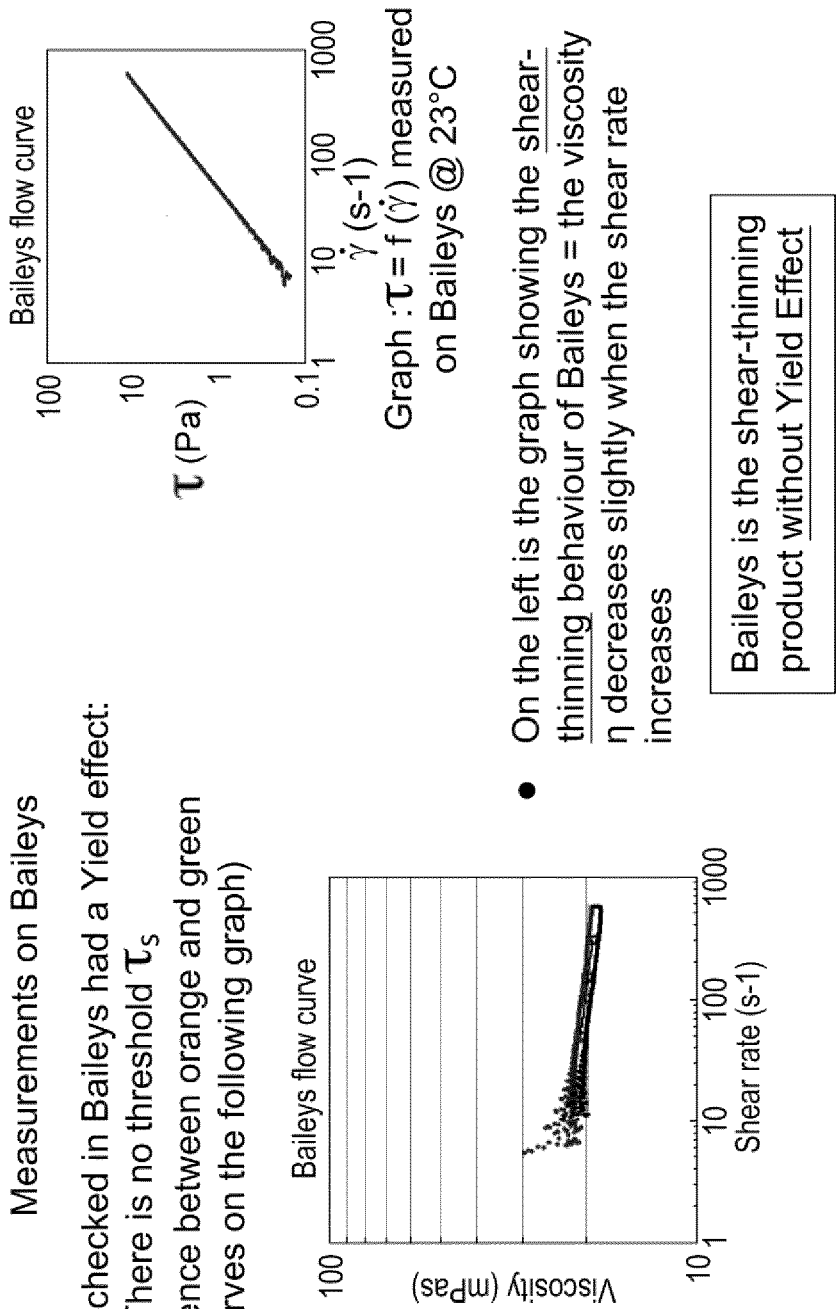
FIG. 18 is a graph showing a Baileys flow curve.

FIGS. 7 to 10 show data collected from dispensing through devices formed in accordance with the present invention. The "pour to dose" dispensing principle is illustrated. All tests have been performed at 23° C. and viscosity measurements referred to herein are taken with a standard Rheometer 301 (Anton Paar) in order to determine Viscosity $\eta = f\gamma$, shear rate); and shear stress $\tau = f$ ($\gamma$, shear rate) as indicated in FIG. 16.

Figure 11:
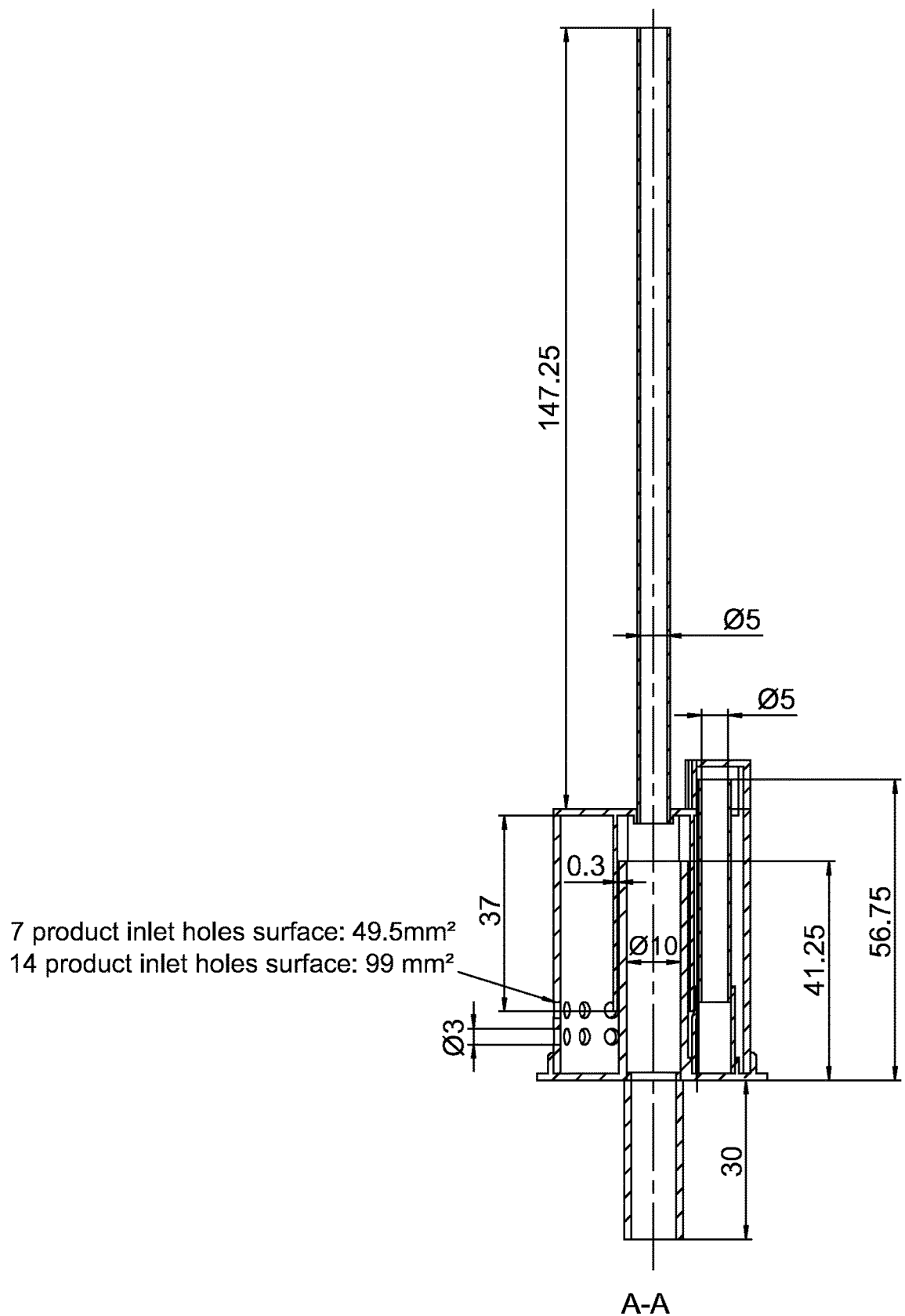
FIG. 11 is cross-sectional view of a second embodiment of the dosing device of the invetion.
Figure 12:
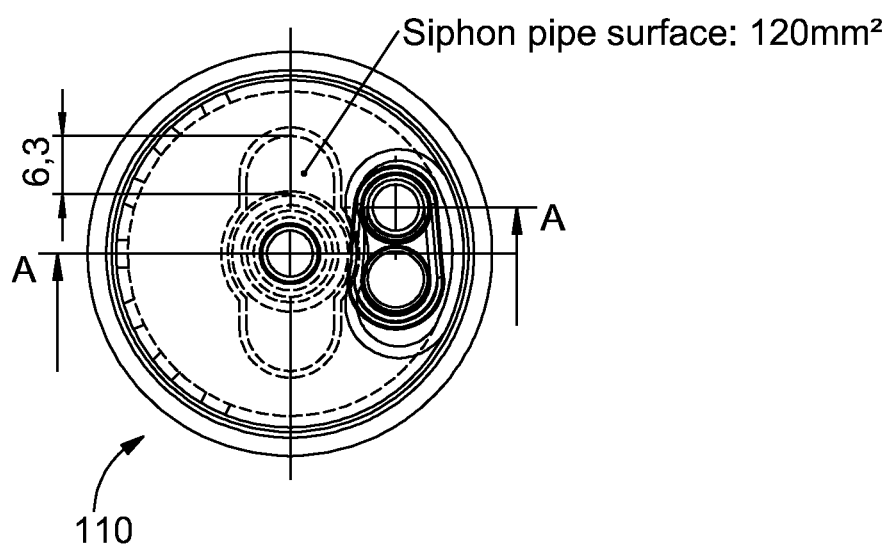
FIG. 12 is a bottom plan view of the second embodiment of the dosing device of FIG. 11.

FIGS. 11 and 12 show a dosing device 110 formed according to a preferred embodiment. As indicated in FIG. 11, the orientation of the 7 or 14 product inlet holes are depicted having either an overall surface of 49 mm2 or 99 mm2, respectively.

Figure 14:
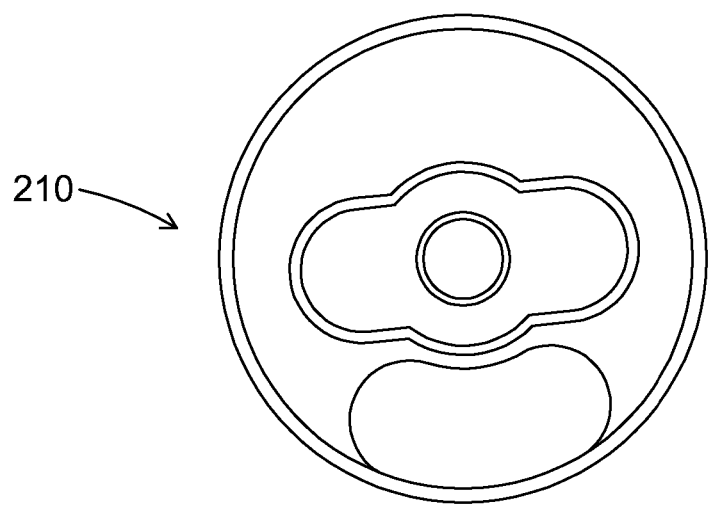
FIG. 14 is a bottom plan view of the dosing device of FIG. 13.

FIGS. 12 and 14 shows a cross-sectional view of the dosing device with the elliptical and/or 8 shaped siphon bell which in this embodiment comprises of a siphon pipe surface of 120 mm2. It has been found that the ratio of the total surface of the product inlet openings (40) and the siphon pipe surface may also affect the dosing, in particular if the total surface of the inlets is smaller than the siphon pipe surface. Preferably, the ratio of the total surface of said inlet openings (40) and said siphon pipe surface (30) may be from 0.35 to 0.9, preferably 0.4 to 0.8+/−0.03. Preferably the product inlet holes surface is in the range of 40 to 100 mm2, preferably 49 to 99 mm2. Hence, as shown in FIGS. 7 to 11 and 12, seven and/or 14 inlet holes ensure correct dosing.

Figure 13:
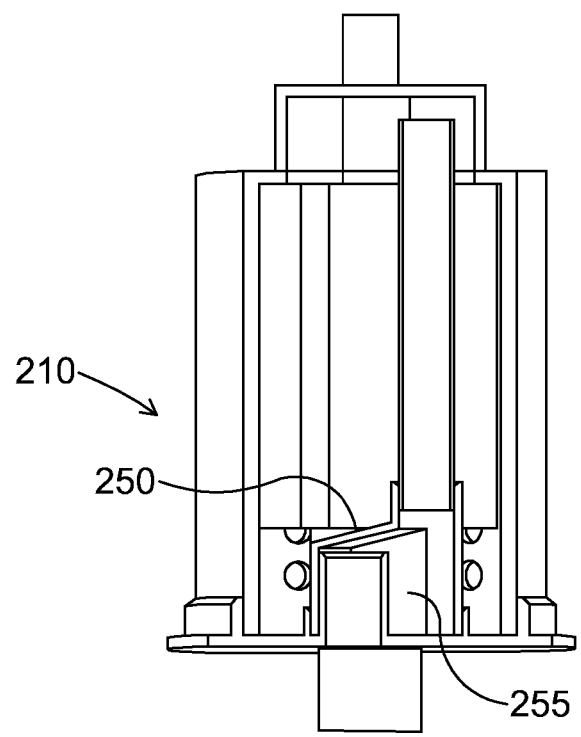
FIG. 13 is a cross-sectional view of an embodiment of a dosing device of the invention having an elliptical and/or 8 shaped siphon bell.

FIGS. 13 and 14 show a dosing device 210 formed according to a preferred embodiment. FIG. 13 illustrates the chicane 250 which can be additionally present in order to avoid any leakage. If a highly viscous product is dosed with the present dosing device such a chicane is of great advantage, since after dosing a small amount of the sticky highly viscous liquid can remain at the outlet pipe surface and can result in a final unwanted drop. Hence, this remaining liquid can accumulate in the space 255 created by the chicane. Thereby, dripping can be avoided.

Figure 15:
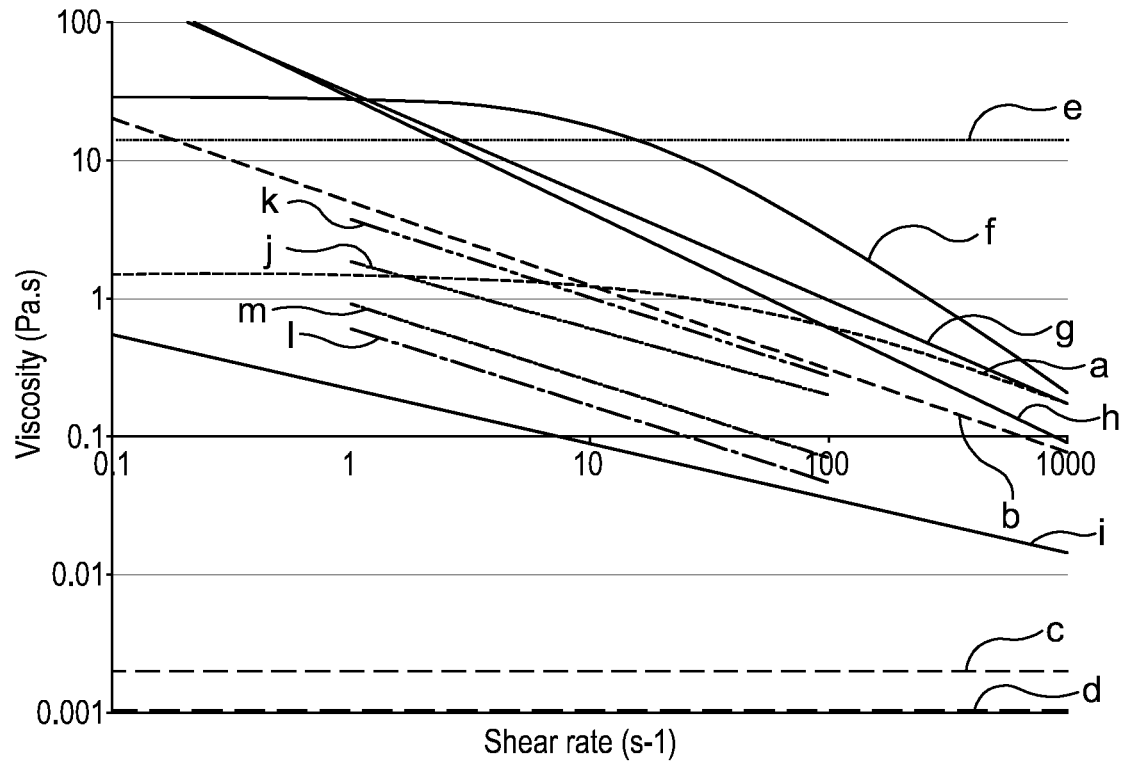
FIG. 15 shows shear rate and viscosity data for experiments with liquids of different viscosities.

FIG. 15 shows the results of certain experiments using dosing devices of the type shown in FIGS. 11 to 14 in combination with liquids of different viscosities.

The viscosity and rheology profile of the liquid may impact the accuracy, speed of dosage, and comfort in the squeeze operation. It has been found that liquids having a shear thinning-type rheology profile and viscosity within the below-mentioned ranges can be surprisingly well dosed at various angles and provide a drip-free dose. In a preferred embodiment the liquids herein have a viscosity of from 1.1 Pa·s to 3.70 Pa·s measured at 100 s$^{-1}$ at 23° C. It has further surprisingly been found that the above viscosities will deliver a constant dose of liquid.

FIGS. 16 to 19 details further experiments undertaken using dosing devices formed in accordance with the present invention.

FIG. 20 depicts extrapolated and measured values of tested various different laundry agents with the dosing device. The inventors surprisingly revealed that the dosing device of the present invention is capable of dosing different highly viscous product by having a viscosity limit to 0.1 Pa·s at 100 s−1.

TABLE 2

This table shows further results using a device formed in accordance with the present invention.

|  | Product | Water | Ariel France | Ariel UK | Lenor | |
|---|---|---|---|---|---|---|
| at shear rate of 1 s−1 | P&G η value (Pa · s) | 0.001 | 3.707 | 1.836 | | |
|  | Agro Paristech η value (Pa · s) | 0.001 | 0.92 | 0.46 | 0.22 | Extrapolated, not reliable values |
|  | Prototype V16 viscosity limit |  | 0.93 < η < 0.62 |  | | |
| at shear rate of 100 s−1 | P&G η value (Pa · s) | 0.001 | 0.31 | 0.21 | | |
|  | Agro Paristech η value (Pa · s) | 0.001 | 0.28 | 0.2 | 0.035 | Measured, reliable values |
|  | Prototype V16 viscosity limit |  | 0.071 < η < 0.048 |  | | |

Although illustrative embodiments of the invention have been disclosed in detail herein, with reference to the accompanying drawings, it is understood that the invention is not limited to the precise embodiments shown and that various changes and modifications can be effected therein by one skilled in the art without departing from the scope of the invention as defined by the appended claims and their equivalents.

The invention claimed is:

1. A dosing device comprising:
   a dosing chamber having an inlet through which product can enter from a container;
   an outlet into which product flows from the chamber and through which product flows out of the device;
   a siphon member located around the outlet
   a vent opening in the chamber
   a container-side vent which opens into the container,
   in which:
   the siphon member terminates at a level L1 with respect to the outlet
   the outlet opens into the chamber at a level L2
   such that in use product flows into the chamber through the inlet/s and fills the chamber until L2 is reached and then product is siphoned from the chamber into the outlet by the siphon member, the siphoning continuing until product in the chamber reaches L1,
   whereupon:
   air entering the vent opening interrupts the siphoning; and
   air vents into the container through the container-side vent such that thereafter recharging of the chamber repeats,
   in which
   a chicane is provided for preventing leakage of product through the outlet, said chicane defining an outlet receiving orifice, an exit pathway, a space having a floor and a slanted upper surface communicating said outlet receiving orifice and said exit pathway, said outlet emptying through said outlet receiving orifice into said space, said exit pathway extending above said floor, said exit pathway offset from said outlet such that drips from said outlet accumulate in said space for avoiding dripping;
   in which
   the outlet is generally cylindrical with a generally circular section, in that the siphon member extends around the outlet, and in that the siphon member has a section having a generally figure-of-eight outline, or an elliptical section;
   the outlet is concentrically arranged within the siphon member.

2. A device as claimed in claim 1, in which the chicane includes a reservoir for catching product in advance of the outlet.

3. A device as claimed in claim 1, in which the inlet comprises one or more apertures.

4. A device as claimed in claim 1, in which the vent opening comprises a tube.

5. A device as claimed in claim 3, in which the vent opening tube has one end which opens into the chamber and one end which is exposed to atmospheric pressure.

6. A device as claimed in claim 1, in which the vent opening opens into the chamber at a level L3 which is above L2 in use.

7. A device as claimed in claim 1, in which the container-side vent is a tube.

8. A device as claimed in claim 1, in which air vents into the container from the vent opening and/or from the outlet.

9. A device as claimed in claim 1, in which the outlet is a tube.

10. A dosing device comprising:
    a dispensing chamber having one or more inlet apertures through which product can enter the device from a container;
    a cylindrical outlet tube into which product flows from the chamber and through which product flows out of the device;
    a siphon bell located around the outlet tube, the siphon bell having a section with a generally figure-of-eight outline, or having an elliptical section, wherein the outlet is concentrically arranged within the siphon member;
    an atmosphere vent tube positioned in the chamber and having one end which opens into the chamber and at the other end is exposed to atmosphere,
    a container-side vent tube which extends into the container,
    in which:
    the siphon bell terminates at a height H1 with respect to the outlet tube
    the outlet tube opens into the chamber at a height H2
    such that in use product flows into the chamber through the inlets and fills the chamber until it reaches H2 and then product is siphoned from the chamber into the outlet tube through a gap between the siphon bell and the outlet tube, the siphoning continuing until product in the chamber reaches height H1, whereupon:

air entering the chamber from the atmosphere vent tube interrupts the siphoning air vents into the container through the container-side vent tube and thereafter re-charging of the dosing chamber repeats, in which a chicane is provided for preventing leakage of product through the outlet tube, said chicane defining an outlet tube receiving orifice, an exit pathway, a space having a floor and a slanted upper surface communicating said outlet tube receiving orifice and said exit pathway, said outlet tube emptying through said outlet tube receiving orifice into said space, said exit pathway extending above said floor, said exit pathway offset from said outlet tube such that drips from said outlet tube accumulate in said space for avoiding dripping.

11. A device as claimed in claim 1 in combination with a container.

12. A combination as claimed in claim 11, in which the container is filled with flowable product.

13. A combination as claimed in claim 12, in which the flowable product as a viscosity in the range of 0.001 mP·as to 10 mP·as.

14. A dosing apparatus for dispensing a dose of liquid according to claim 1 comprising:
(i) a container having an outlet and a siphon member located around the outlet, wherein:
the outlet is generally cylindrical with a generally circular section, in that the siphon member extends around the outlet, and in that the siphon member has a section having a generally figure-of-eight outline, or an elliptical section;
the outlet is concentrically arranged within the siphon member;
(ii) said dosing device operably connected to said container,
(iii) a liquid contained in said container;
wherein said liquid is a shear thinning liquid and said shear thinning liquid has a viscosity of greater than 1 Pa·s measured at 100 s"1 at 23° C.

15. A device as claimed in claim 1, in which the ratio of the total surface of the inlet to the siphon member surface is between 0.35 and 0.9.

16. A device as claimed in claim 1, in which the inlet surface area is between 40 and 100 mm².

17. A device as claimed in claim 10, in which the ratio of the total surface of the inlet to the siphon member surface is between 0.35 and 0.9.

18. A device as claimed in claim 10, in which the inlet surface area is between 40 and 100 mm².

19. A device as claimed in claim 14, in which the ratio of the total surface of the inlet to the siphon member surface is between 0.35 and 0.9.

20. A device as claimed in claim 14, in which the inlet surface area is between 40 and 100 mm².

21. A dosing device comprising:
a dosing chamber having a device inlet through which product can enter from a container;
a device outlet into which product flows from the chamber and through which product flows out of the device;
a siphon member located around the outlet
a vent opening in the chamber
a container-side vent which opens into the container,
in which:
the siphon member terminates at a level L1 with respect to the outlet
the outlet opens into the chamber at a level L2
such that in use product flows into the chamber through the inlet/s and fills the chamber until L2 is reached and then product is siphoned from the chamber into the outlet by the siphon member, the siphoning continuing until product in the chamber reaches L1,
whereupon:
air entering the vent opening interrupts the siphoning; and
air vents into the container through the container-side vent such that thereafter recharging of the chamber repeats,
in which
a chicane is provided by the siphon member for preventing leakage of product through the outlet, the siphon member inlet and the device outlet are offset and the chicane is slanted, and in which the chicane creates a space offset from the outlet in the siphon member in which liquid can accumulate to prevent dripping from the outlet.

22. A device as claimed in claim 21, in which:
the outlet is generally cylindrical with a generally circular section, in that the siphon member extends around the outlet, and in that the siphon member has a section having a generally figure-of-eight outline, or an elliptical section.

23. A device as claimed in claim 22, in which the outlet is concentrically arranged within the siphon member.

* * * * *